April 21, 1931.　　　　A. C. HUTT　　　　1,802,256
STEERABLE ROAD VEHICLE
Filed July 6, 1928　　　4 Sheets-Sheet 1
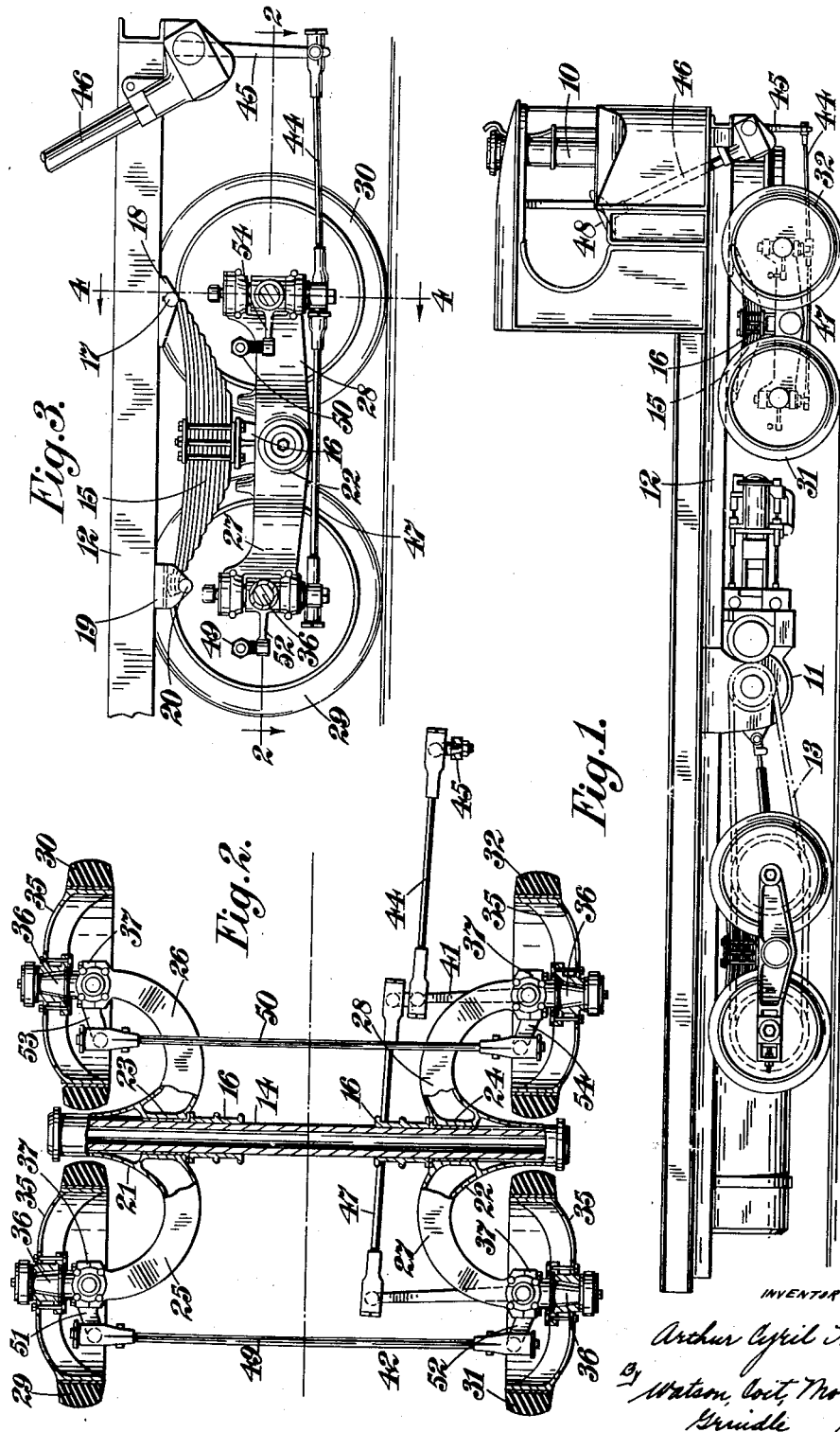

April 21, 1931.   A. C. HUTT   1,802,256
STEERABLE ROAD VEHICLE
Filed July 6, 1928   4 Sheets-Sheet 2

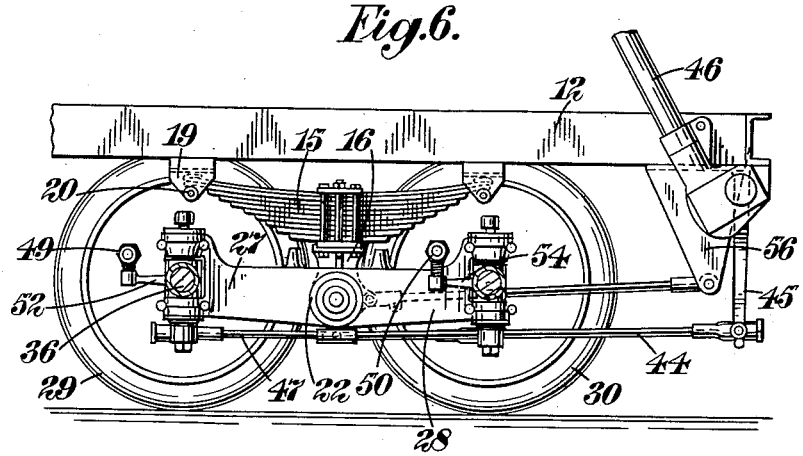
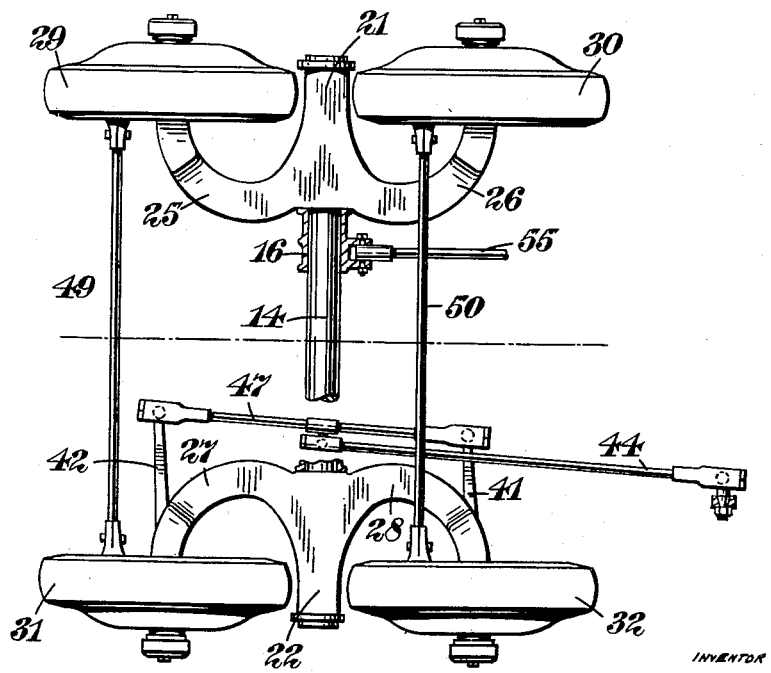

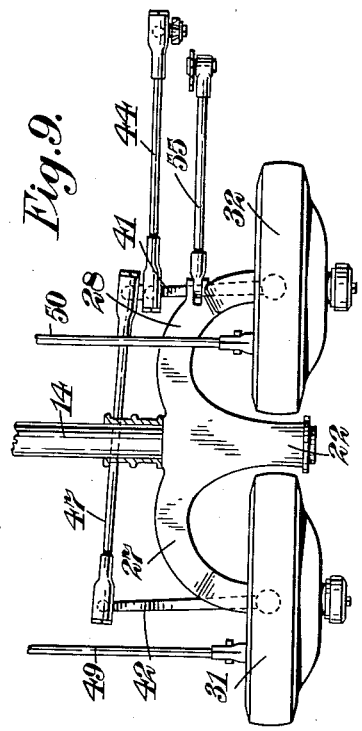
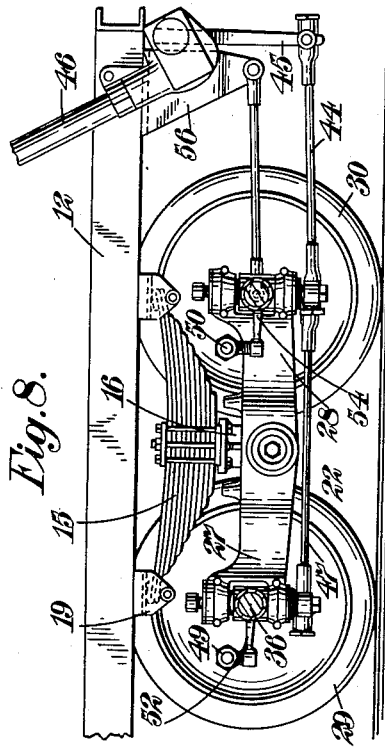

Patented Apr. 21, 1931

1,802,256

UNITED STATES PATENT OFFICE

ARTHUR CYRIL HUTT, OF SHREWSBURY, ENGLAND, ASSIGNOR TO THE "SENTINEL" WAGGON WORKS LIMITED, OF LONDON, ENGLAND, A BRITISH COMPANY

STEERABLE ROAD VEHICLE

Application filed July 6, 1928, Serial No. 290,800, and in Great Britain March 22, 1928.

This invention is for improvements in or relating to steerable road-vehicles and has for one of its objects to improve road-vehicles of the type having six or more road-wheels. In particular, the invention aims at improving the steering and smooth running qualities of the vehicles.

It is a further object of the invention to provide an eight-wheeled road-vehicle whereof four of the wheels are steerable, and whereof the wheels are arranged in pairs, two pairs at each side of the vehicle, and the wheels in a pair being able to adjust themselves vertically to accommodate irregularities in the ground.

For a more complete understanding of the invention, there will now be described, by way of example only and with reference to the accompanying drawings, certain constructional forms of road-vehicle according to the invention. It is to be understood, however, that the invention is not restricted to the precise constructional details set forth.

In these drawings—

Figure 1 is a side elevation of one form of eight-wheeled vehicle according to the invention;

Figure 2 is a horizontal section on the line 2—2 of Figure 3 through the front wheels and main axle of the vehicle, and is on a scale larger than that of Figure 1;

Figure 3 is a side elevation of the parts shown in Figure 2;

Figure 6 is a side elevation corresponding to Figure 3, but showing a modified construction;

Figure 7 is a plan, partly in section, of certain of the parts shown in Figure 6;

Figure 8 is a side elevation corresponding to Figures 3 and 6, but showing a further modification, and Figure 9 is a plan of certain of the parts shown in Figure 8.

Like reference numerals indicate like parts throughout the drawings.

Figure 4:
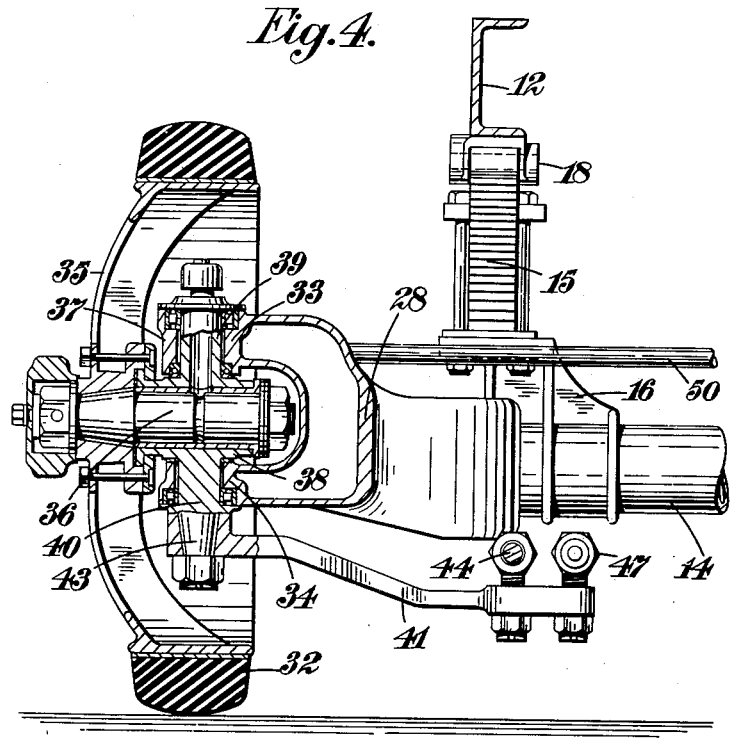
Figure 4 is a partial section on the line 4—4 of Figure 3, but on a scale larger than that of Figure 3.

Referring firstly to Figures 1 to 5, the vehicle therein illustrated is steam-driven and is supported on a front steerable undercarriage and a rear propelling undercarriage. A steam boiler 10 is mounted at the front end of the vehicle, and a horizontal steam-engine 11 is arranged beneath the vehicle frame 12 between the two undercarriages. The rear undercarriage has four road-wheels and may be of any desired construction, such as that described in my co-pending patent application, Serial No. 268,582, filed April 9, 1928, in which the road-wheels are carried upon a single through-axle so as to be able to swing vertically about the latter to accommodate irregularities in the ground. The rear-wheels are propelled from the steam-engine by a chain or chains 13.

The front undercarriage comprises a tubular frame-member or cross-axle 14 having a pair of semielliptic springs 15 mounted on it by brackets 16, these springs 15 serving to support the vehicle-frame 12. For this purpose, the leading end of each spring is anchored by a pin 17 to a bracket 18 depending from the frame 12, and the rear end of each spring is arranged to slide between a horizontal surface of a bracket 19 carried by the frame 12 and a cross-pin 20 on the bracket.

A pair of trunnion-frames 21 and 22 is journalled on the axle 14, one at each end. Each trunnion-frame is of anchor formation and comprises a central bearing 23, 24 which embraces the axle 14 and curved arms 25, 26 and 27, 28 whereof the ends lie substantially parallel to the axle 14. The trunnion-frames 21 and 22 are free to oscillate within limits upon the ends of the axle 14 and they carry road-wheels 29, 30 and 31, 32, respectively.

The end of each of the curved arms of the trunnion-frames is forked, see particularly Figure 4, to provide two bearings 33 and 34 one above the other, and is also provided with a detachable end cap 37. Within these bearings lies the steering axis of the corresponding road-wheel. The road-wheels have concave walls 35 with the concave face directed towards the inside of the vehicle, and each wheel is mounted upon a stub-axle 36 which is received in the interior of a sleeve 38 having upward and downward extensions 39 and 40 which are received in the bearings 33 and 34. Consequently, the ordinary travelling rotation of the road-wheel takes place about the axis of the stub-axle 36, and steering takes place about the axis of the extensions 39 and 40, while movement to accommodate road irregularities takes place about the axis of the main axle 14. In this way, any two associated road-wheels on the one side of the vehicle will be able to share their load more or less equally between them. It will be appreciated that the steering axis is located inside the concavity of the road-wheel which enables the point of contact of the tyre on the road to be approximately in line with the steering axis, so that the steering effort shall be as small as possible. The anchor shape of the arms 25, 26, 27 and 28 allows the road-wheels to be turned through the angle necessary for the steering lock chosen for the vehicle.

The offside stub-axles are provided with levers 41, 42 which are secured on the tapered end 43 of the lower stub-axle extension 40, the levers reaching below the trunnion-frame towards the middle of the vehicle. The lever 41 is connected by a link 44 to an arm 45 which depends from the bottom of the driver's steering column 46, it being connected to the latter in any suitable way, such as by worm gearing. The levers 41 and 42 are connected together by another link 47, the joints between the levers 41 and 42, the links 47 and 44, and the arm 45, being ball-and-socket joints. The link 47 is jointed to the lever 41 at a point closer to the pivot of the corresponding stub-axle than the point at which the link 47 is connected to the lever 42 is to the pivot of the other stub-axle. Consequently, when the lever 41 is moved by the operation of the driver's steering-wheel 48, the lever 42 will also be moved in the same direction, but through a smaller angle. By a suitable selection of points of connection of the levers 41 and 42, to the link 47, the axes of the offside road-wheels 31 and 32 will, during steering, intersect approximately at the centre of the turning circle for the vehicle. Moreover, the nearside wheels 29 and 30 are connected to their respective offside wheels 31 and 32 by links 49 and 50, and converging arms 51 and 52 and 53 and 54, respectively. This method of interconnecting the road-wheels will ensure that all four steering wheels will be moving along the circumferences of substantially concentric circles when the vehicle is moving around a corner. The effect is illustrated in Figure 5, and it will be appreciated that during each steering operation, the road-wheels on the four stub-axles are deflected through different angles inversely proportionate to the angles between the plane of each wheel before deflection and a line joining the centre of the wheel to the centre of the turning circle of the vehicle.

Figure 5:
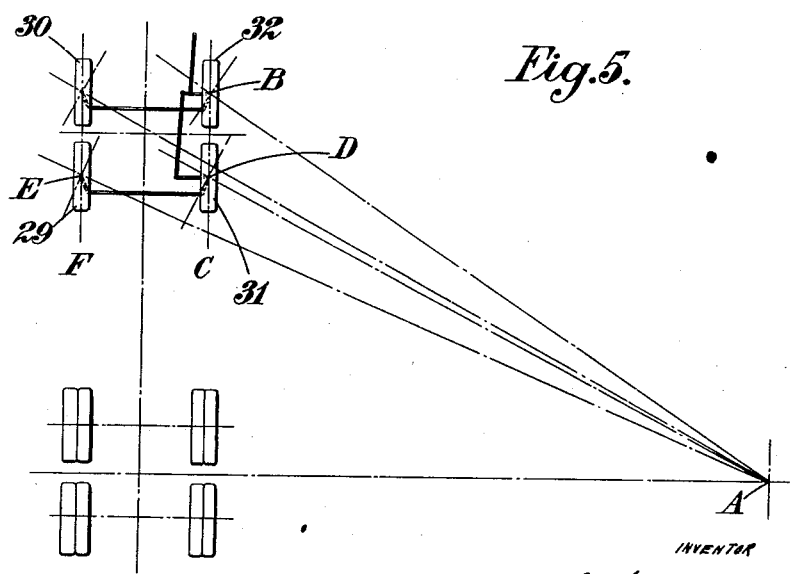
Figure 5 is a small scale diagrammatic view illustrating the turning circle of the vehicle.

Thus, referring to Figure 5, the angle ADC being greater than the angle ABC, the road-wheel 31 will be deflected through a smaller angle than the road-wheel 32. Furthermore, the angle ADC being smaller than the angle AEF, the road-wheel 31 will be deflected through a greater angle than the road-wheel 29.

It will be seen that the connection of the link 44 to the lever 41 being substantially in the straight line between the main axle and the point of connection of the link 44 to the driver's steering column, rotary movements of the road-wheels and trunnion members about the main axle will not impart jerk to the driver's steering column.

The construction shown in Figures 6 and 7 is substantially the same as that shown in the previous figures, except that both ends of the springs 15 are free to slide longitudinally of the frame 12. The axle 14 is anchored to the frame 12 by radius rods 55 which at one end are secured to brackets 56 depending from the frame 12, and at the other end reach to the axle 14. The link 44 in this construction is not attached to the lever 41, but reaches to a position immediately below the axle 14, and is there attached by a ball-and-socket joint to the link 47. This construction has the advantage that since the main axle is anchored to the chassis independently of the ends of the vehicle springs 15, flattening of the latter due to unevenness in the road, will not impart a jerk to the driver's steering wheel. Furthermore, the point of attachment of the link 44 to the link 47 being comparatively close to the main axle, rotary movements of the road wheels and trunnion members about the main axle will impart little jerk to the driver's steering wheel.

The construction shown in Figures 8 and 9 is also intended to obviate, as far as possible, the transfer of shocks from the road-wheels to the driver's steering column. The link 44 is connected to the lever 41 as in the construction shown in Figures 1 to 5, the points of attachment of the lever 44 to the lever 41 and to the arm 45, being in a straight line which substantially intersects the axis of the main axle 14. The main axle and the road-wheels are anchored to the vehicle chassis by radius rods 55, which at one end are attached to brackets 56 on the chassis, and at the other end are jointed to the trunnion members. In Figure 9, the link 55 is shown hinged to the curved trunnion arm 28. The point of attachment of the radius rod 55 to the bracket 56, and to the arm 28, are in a straight line which substantially intersects the axis of the main axle 14, and, of course, the vehicle springs 15 are free to slide in their chassis brackets. In consequence, flattening of the springs due to irregularities in the road surface will not impart any jerk to the driver's steering column, nor will movements of the forecarriage about the axle 14. The links 44 will move in substantially the same path as the radius rods 55 during passage of the vehicle over an uneven road.

It will be readily understood that many modifications may be made in the construction of the vehicle and its parts without departing from the present invention, and that, moreover, the invention may be applied to vehicles having six or more wheels driven by internal combustion engines, electric motors, or any other desired means.

I claim:

1. A steerable road vehicle having a driver's steering column, a four wheeled under-carriage which comprises, in combination, a main axle, trunnion frames mounted on the main axle one at each side of the under-carriage, each to oscillate on said main axle about a substantially horizontal axis independently of the other trunnion frame, four road wheel stub axles and means for mounting said stub axles, two on each trunnion frame, one in front of, and the other behind the main axle in such manner that all four stub axles can turn each about a separate steering axis, springs interposed between the main axle and the vehicle chassis, a radius-rod articulated at one end of the vehicle chassis and at the other end to a part of the under-carriage, linkage inter-connecting four stub axles so that they can be turned simultaneously in the same direction about their respective steering axes and a link connecting said linkage to the driver's steering column, the points of connection of said link to said linkage and to the driver's steering column being substantially in a straight line intersecting the main axle and the points of articulation to said radius-rod being such that when movement of the under-carriage relatively to the vehicle chassis occurs, the path of movement of the point of articulation between the rod and the under-carriage is substantially parallel to the path of movement of the point at which said link is connected to said linkage.

2. A steerable road vehicle having a driver's steering column and a four wheeled under-carriage which comprises, in combination, a main axle, trunnion frames mounted on the main axle, one at each side of the under-carriage, each of said trunnion frames having a central bearing embracing the main axle on which it is mounted to oscillate about a substantially horizontal axis independently of the other trunnion frame and two arms rigid with each other and the central bearing, the ends of which arms lie substantially parallel to the main axle and are directed towards the outside of the vehicle to receive the road wheels, four road wheel stub axles, means for mounting said stub axles, one on the end of each arm of each trunnion frame in such manner that all four stub axles can turn each about a separate steering axis, four road wheels one mounted on each stub axle and steering means which comprises two levers connected one to each of the two stub-axles on one side of the vehicle, a link connecting said levers and so arranged that its points of connection to the lever associated with the wheel adjacent to the end of the vehicle is nearer to the steering axis of the corresponding stub-axle than the point of connection of the link to the lever, associated with the other wheel, is to the steering axis of the other stub-axle, two levers connected one to each of the two stub-axles on the other side of the vehicle, two track-rods connected one to each two levers appropriated to corresponding wheels on opposite sides of the vehicle, and a link connected to one of the first said levers and to the driver's steering column, and wherein the said first link and the said track-rods are so connected to the said levers that the traveling axes, about which the four steerable wheels revolve, intersect at, or approximately at, the center of the turning circle for the vehicle.

In testimony whereof I affix my signature.

ARTHUR CYRIL HUTT.